United States Patent
Kurihara et al.

(10) Patent No.: US 8,501,888 B2
(45) Date of Patent: Aug. 6, 2013

(54) FLUORINE-CONTAINING POLYMER AND SURFACE-MODIFYING AGENT CONTAINING THE SAME AS ACTIVE INGREDIENT

(75) Inventors: Satoshi Kurihara, Ibaraki (JP); Seiichiro Murata, Ibaraki (JP); Katsuyuki Sato, Ibaraki (JP); Masayosi Horiuti, Ibaraki (JP); Sumiko Mouri, Ibaraki (JP); Hideki Abe, Ibaraki (JP); Ji-Shan Jin, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 372 days.

(21) Appl. No.: 12/677,187

(22) PCT Filed: Jul. 16, 2008

(86) PCT No.: PCT/JP2008/062783
§ 371 (c)(1),
(2), (4) Date: Mar. 9, 2010

(87) PCT Pub. No.: WO2009/034773
PCT Pub. Date: Mar. 19, 2009

(65) Prior Publication Data
US 2011/0009555 A1    Jan. 13, 2011

(30) Foreign Application Priority Data

Sep. 10, 2007 (JP) .................. 2007-233554
Sep. 10, 2007 (JP) .................. 2007-233555

(51) Int. Cl.
*C08F 18/20*    (2006.01)

(52) U.S. Cl.
USPC .......................................... 526/245; 524/544

(58) Field of Classification Search
USPC ................ 526/245; 560/223; 524/544
See application file for complete search history.

(56) References Cited

U.S. PATENT DOCUMENTS

| | | | | |
|---|---|---|---|---|
| 3,547,861 A | * | 12/1970 | Anello et al. | 442/80 |
| 3,916,009 A | | 10/1975 | Jäger | |
| 3,919,183 A | | 11/1975 | Jäger | |
| 5,688,309 A | * | 11/1997 | Shimada et al. | 106/2 |
| 5,725,789 A | * | 3/1998 | Huber et al. | 252/8.62 |
| 7,566,801 B2 | * | 7/2009 | Murata et al. | 560/232 |
| 2009/0291222 A1 | * | 11/2009 | Qiu et al. | 427/427.4 |

FOREIGN PATENT DOCUMENTS

| CH | 018659/72 | 12/1972 |
|---|---|---|
| CH | 13054/73 | 9/1973 |
| JP | 59-108081 | 6/1984 |
| WO | WO2004/035708 A1 | 4/2004 |
| WO | WO2007/105633 A1 | 9/2007 |
| WO | WO 2007105633 A1 * | 9/2007 |

OTHER PUBLICATIONS

European Search Report from corresponding European application No. 08778200.9, dated Nov. 11, 2010, 5 pages.
Huang, Ji-Qing et al., <<Synthesis and repellent properties of vinylidene fluoride-containing polyacrylates >>, *Journal of Fluorine Chemistry*, 128, 1469-1477, Aug. 14, 2007.
English Translation of International Preliminary Report on Patentability (Chapter I) and Written Opinion from corresponding PCT application No. PCT/JP2008/062783, dated Apr. 8, 2010, 5 pages.
International Search Report from corresponding PCT application No. PCT/JP2008/062783, dated Oct. 14, 2008, 4 pages.

* cited by examiner

*Primary Examiner* — Nicole M Buie-Hatcher
(74) *Attorney, Agent, or Firm* — Brinks Hofer Gilson & Lione

(57) ABSTRACT

A fluorine-containing polymer comprising a fluoroalkyl alcohol (meth)acrylic acid derivative represented by a general formula, $C_nF_{2n+1}(CH_2CF_2)_a(CF_2CF_2)_b(CH_2CH_2)_c OCOCR\!=\!CH_2$ (in the formula, R is a hydrogen atom or a methyl group, n is an integer of 1 to 6, preferably 2 to 4, a is an integer of 1 to 4, b is an integer of 0 to 3, and c is an integer of 1 to 3) containing in 5 to 100 wt % as a polymerization unit. A organic solvent solution or aqueous dispersion of the fluorine-containing polymer is effectively used as, for example, a surface-modifying agent such as a water- and oil-repellent or an oil barrier.

22 Claims, No Drawings

FLUORINE-CONTAINING POLYMER AND SURFACE-MODIFYING AGENT CONTAINING THE SAME AS ACTIVE INGREDIENT

RELATED APPLICATION

This application is a 35 U.S.C. §371 national phase filing of International Patent Application No. PCT/JP2008/062783, filed Jul. 16, 2008, through which and to which priority is claimed under 35 U.S.C. §119 to Japanese Patent Application Nos. 2007-233554, filed Sep. 10, 2007 and 2007-233555, filed Sep. 10, 2007.

TECHNICAL FIELD

The present invention relates to a fluorine-containing polymer and a surface-modifying agent containing the polymer as an active ingredient. More specifically, the present invention relates to a fluorine-containing polymer that is a homopolymer or copolymer of a (meth)acrylic acid derivative including a perfluoroalkyl group having 6 or less carbon atoms, the group being known to be low in bioaccumulation potential, and relates to a surface-modifying agent containing the polymer as an active ingredient.

BACKGROUND ART

Acrylic acid derivatives of perfluoroalkyl group-containing alcohols, for example, $CF_3(CF_2)_7CH_2CH_2OCOCH=CH_2$, are used in large quantity as synthetic monomers of fluorine-containing copolymers constituting water- and oil-repellents for textile. Perfluoroalkyl alcohols serving as acrylated precursors of the acrylic acid derivatives are widely used as, for example, surfactants.

[Patent Document 1] JP-B-63-22237

In Patent Document 2, it is described that in a surface-treating agent of a substrate, the expression of water- and oil-repellent properties of (meth)acrylate containing a perfluoroalkyl group (Rf) depends on the orientation of the Rf group on a treated film and further described that for the orientation of a Rf group, the presence of melting point in a microcrystal originating the Rf group (having 8 or more carbon atoms) is required, and, therefore, perfluoroalkyl group-containing (meth)acrylate including a perfluoroalkyl group having 8 or more carbon atoms has been used. In addition, it has been shown that in the case of not containing an isocyanate monomer, the contribution to water- and oil-repellent properties, which is observed in the (meth)acrylate including a perfluoroalkyl group having 8 or more carbon atoms, is insufficient when the perfluoroalkyl group-containing (meth)acrylate includes a perfluoroalkyl group having 8 or less carbon atoms.

[Patent Document 2] WO 2004/035708

On the other hand, in recent years, perfluorooctanoic acid (PFOA) or perfluoroalkyl group-containing carboxylic acid (PFCA) including a perfluoroalkyl group having 8 or more carbon atoms, which do not occur in nature, have been observed to be present in the air, rivers, and so on. It has been reported that, among these compounds, those having perfluoroalkyl groups including about 8 carbon atoms have high bioaccumulation potential and therefore have an environmental problem. Therefore, it is anticipated that the manufacturing and the use of these compounds will become difficult in the future.

Note that, presently, it is suggested that a possibility that among telomer compounds used as raw materials of surface-modifying agents such as water- and oil-repellents, compounds including perfluoroalkyl groups having 8 or more carbon atoms are converted into PFCA in the environment. Therefore, it is anticipated that the manufacturing and the use of these compounds will be restricted. On the other hand, though compounds including perfluoroalkyl groups having 6 or less carbon atoms are recognized to be low in bioaccumulation potential, the compounds including perfluoroalkyl groups having 6 or less carbon atoms are difficult to achieve performance required in products such as surface-modifying agents.

DISCLOSURE OF THE INVENTION

Problem to be Solved by the Invention

It is an object of the present invention to provide a fluorine-containing polymer that comprises a homopolymer or copolymer of a fluoroalkyl alcohol (meth)acrylic acid derivative including a perfluoroalkyl group having 6 or less carbon atoms, the group being known to be low in bioaccumulation potential, and to provides a surface-modifying agent containing the polymer as an active ingredient.

Means for Solving the Problem

The object of the present invention is achieved by a fluorine-containing polymer comprising a fluoroalkyl alcohol acrylic acid derivative or a corresponding methacrylic acid derivative represented by the general formula:

$$C_nF_{2n+1}(CH_2CF_2)_a(CF_2CF_2)_b(CH_2CH_2)_cOCOCR=CH_2$$

(in the formula, R is a hydrogen atom or a methyl group, n is an integer of 1 to 6, a is an integer of 1 to 4, b is an integer of 0 to 3, and c is an integer of 1 to 3) containing in 5 to 100 wt % as a polymerization unit and by a surface-modifying agent containing the polymer as an active ingredient. In the above-mentioned general formula, from the viewpoints of polymerization solution stability, solubility, and polymerization rate during the polymerization, it is preferable that n be an integer of 2 to 4, a be an integer of 1 to 2, b be an integer of 1 to 3, and c be an integer of 1 to 2.

Effects of the Invention

The a fluorine-containing polymer being a homopolymer or copolymer of a fluoroalkyl alcohol (meth)acrylic acid derivative according to the present invention is constituted of a perfluoroalkyl group having 6 or less carbon atoms, the group being low in bioaccumulation potential, and also readily forms a double bond by the elimination of HF from a $CH_2CF_2$ group derived from vinylidene fluoride in the molecule, which allows easy decomposition by ozonolysis. Consequently, the polymer is low in disturbance of environment and also can be suitably used as an active ingredient of a surface-modifying agent, such as a water- and oil-repellent or an oil barrier, having performance equivalent to those of conventional fluorine-containing polymers.

BEST MODES FOR CARRYING OUT THE INVENTION

The fluoroalkyl alcohol (meth)acrylic acid derivative used as a monomer of the fluorine-containing polymer is produced by esterifying a fluoroalkyl alcohol represented by the general formula:

$$C_nF_{2n+1}(CH_2CF_2)_a(CF_2CF_2)_b(CH_2CH_2)_cOH$$

with acrylic acid or methacrylic acid. Note that the term "(meth)acrylic acid" denotes acrylic acid or methacrylic acid. The fluoroalkyl alcohol is produced from a corresponding fluoroalkyl iodide.

The fluoroalkyl iodide:

$$C_nF_{2n+1}(CH_2CF_2)_a(CF_2CF_2)_b(CH_2CH_2)_cI$$

serving as the starting material of fluoroalkyl alcohol synthesis is produced through an addition reaction of ethylene to a terminally iodinated compound represented by the general formula:

$$C_nF_{2n+1}(CH_2CF_2)_a(CF_2CF_2)_bI \qquad (I)$$

The addition reaction of ethylene is performed by adding pressurized ethylene to the above-mentioned compound [I] in the presence of a peroxide initiator. The addition number of ethylene depends on the reaction conditions, but is one or more, preferably one to three, and more preferably one. The addition reaction is affected by the decomposition temperature of an initiator used, but is usually conducted at about 80 to 120° C., and when a peroxide initiator that is decomposed at a low temperature is used, the reaction can be conducted at 80° C. or lower. Examples of the peroxide initiator include tertiary butyl peroxide, di(tertiary-butyl cyclohexyl)peroxydicarbonate, dicetyl peroxydicarbonate, di-n-propyl peroxydicarbonate, diisopropyl peroxydicarbonate, or di-secondary-butyl peroxydicarbonate. From the standpoints of progression and control of the reaction, the peroxide initiator is used in a ratio of about 1 to 5 mol % to the above-mentioned compound [I].

The compound [I] is synthesized through the following series of processes.

(i) A perfluoroalkyl iodide represented by the general formula:

$$C_nF_{2n+1}I \text{ (n:1 to 6)}$$

is subjected to a reaction with vinylidene fluoride in the presence of a peroxide initiator such as the above-mentioned one (in an amount of about 0.1 to 0.5 mol % to the raw material compound) to give a compound (b=0) represented by the general formula:

$$C_nF_{2n+1}(CH_2CF_2)_aI \qquad [II].$$

(ii) Alternatively, a terminally iodinated compound represented by the general formula [I] (b is an integer of 1 to 3, preferably 1 to 2) is given by subjecting tetrafluoroethylene to a reaction with a compound represented by the general formula [II] in the presence of a peroxide initiator. As the peroxide initiator used in this reaction, an organic peroxide initiator such as the above-mentioned one is used in the same ratio as that in the above (i).

The reaction temperature of the addition reaction of vinylidene fluoride and tetrafluoroethylene is affected by the decomposition temperature of an initiator used, but a reaction at a temperature of 80° C. or lower is possible even under a low-pressure condition by using a peroxide initiator that is decomposed at a low temperature. The reaction is conducted as follows: $C_nF_{2n+1}I$ or the above-mentioned compound [II] is charged in an autoclave; the inner temperature of the autoclave is increased to about 10 to 60° C., for example, to 50° C.; then a peroxide initiator dissolved in $C_nF_{2n+1}I$ or the compound [II] is added thereto; and when the inner temperature is increased to, for example, 55° C., a desired amount of vinylidene fluoride or tetrafluoroethylene is fractionally added while maintaining a pressure of about 0.1 to 1.0 MPa; and then aging is performed within a temperature range of, for example, about 55 to 80° C. for about 1 hour. The number, a, of the vinylidene fluoride skeleton and the number, b, of the tetrafluoroethylene skeleton added by the reaction depend on the addition amounts thereof. Usually, the products are formed as a mixture of those having various a values and b values.

These reactions can be performed at low temperature. This allows not only a reduction in energy consumption but also suppression of corrosion due to hydrofluoric acid or the like, to reduce the frequency of renewal of the facilities. In addition, since further inexpensive materials can be used, in conjunction with the reduction in frequency of renewal, the investment cost for facilities can be reduced.

Examples of specific compound [I] to which ethylene is added include the compounds shown below. These compounds are mixtures of oligomers having various a values and b values, and an oligomer having specific a value and b value can be isolated by distilling the mixture. Oligomers not having predetermined a value and b value can be, after isolation or directly as the mixture, subjected again to a reaction with vinylidene fluoride or tetrafluoroethylene for increasing the oligomerization number.

$CF_3(CH_2CF_2)I$
$C_2F_5(CH_2CF_2)I$
$C_2F_5(CH_2CF_2)_2I$
$C_3F_7(CH_2CF_2)I$
$C_3F_7(CH_2CF_2)_2I$
$C_4F_9(CH_2CF_2)I$
$C_4F_9(CH_2CF_2)_2I$
$C_2F_5(CH_2CF_2)(CF_2CF_2)I$
$C_2F_5(CH_2CF_2)(CF_2CF_2)_2I$
$C_2F_5(CH_2CF_2)_2(CF_2CF_2)$
$C_2F_5(CH_2CF_2)_2(CF_2CF_2)_2I$
$C_4F_9(CH_2CF_2)(CF_2CF_2)I$
$C_4F_9(CH_2CF_2)_2(CF_2CF_2)I$
$C_4F_9(CH_2CF_2)(CF_2CF_2)_2I$
$C_4F_9(CH_2CF_2)_2(CF_2CF_2)_2I$

The fluoroalkyl alcohol is produced by, first, subjecting a fluoroalkyl iodide to a reaction with N-methyl formamide $HCONH(CH_3)$ to prepare a mixture of fluoroalkyl alcohol and formate thereof and then subjecting the mixture to hydrolysis in the presence of an acid catalyst. In this reaction, in order to avoid that elimination of HF from $CH_2CF_2$ derived from vinylidene fluoride combined in the fluoroalkyl iodide occurs to reduce the yield thereby, it is preferable to use about 5 to 10 fold molar amount of N-methyl formamide and use p-toluenesulfonic acid aqueous solution as an acid catalyst. The reaction with N-methyl formamide is performed at about 140 to 160° C. for about 4 to 5 hours. The subsequent hydrolysis is performed at about 70 to 90° C. for about 7 to 8 hours.

The resulting fluoroalkyl alcohol can be esterified by acrylic acid or methacrylic acid. In the esterification, first, an aromatic hydrocarbon solvent such as toluene or benzene, a catalyst such as p-toluenesulfonic acid, and hydroquinone serving as a polymerization inhibitor are added to the fluoroalkyl alcohol, followed by heating at about 90 to 100° C. Then, about 1 to 2 fold molar amount of acrylic acid or methacrylic acid is added thereto, followed by heating at about 110 to 120° C. for about 2 to 5 hours for dehydration. Thus, the esterification is performed.

The fluoroalkyl alcohol (meth)acrylic acid derivative is polymerized alone, but also can be copolymerized with another polymerizable fluorine-containing monomer and/or a polymerizable non-fluorine atoms-containing monomer. When a polymerizable fluorine-containing monomer is used, the number of carbon atoms of the polyfluoroalkyl group, preferably the perfluoroalkyl group, of the monomer must be 1 to 6 and preferably 2 to 4.

As the polymerizable fluorine-containing monomer, used are those represented by the general formula:

$$CH_2=CRCOOR_1-(NR_2SO_2)_m-Rf$$

R: hydrogen atom or methyl group,
$R_1$: divalent organic group, preferably alkylene group or polyfluoroalkylene group having 1 to 4 carbon atoms,
$R_2$: lower alkyl group having 1 to 5 carbon atoms,
Rf: polyfluoroalkyl group, preferably perfluoroalkyl group, having 1 to 6, preferably 2 to 4 carbon atoms,
m: 0 or 1.

For example, the polyfluoroalkyl group-containing (meth)acrylate monomers below are used. However, the number n of the carbon atoms of a terminal polyfluoroalkyl group must be 1 to 6, and when the $R_1$ group is a polyfluoroalkylene group and m is 0, the number of carbon atoms as the total with that of the terminal polyfluoroalkyl group must be 1 to 6.

$CH_2=CHCOOCH_2C_nF_{2n}H$
$CH_2=C(CH_3)COOCH_2C_nF_{2n}H$
$CH_2=CHCOOCH_2C_nF_{2n+1}$
$CH_2=C(CH_3)COOCH_2C_nF_{2n+1}$
$CH_2=CHCOOC_2H_4C_nF_{2n+1}$
$CH_2=C(CH_3)COOC_2H_4C_nF_{2n+1}$
$CH_2=CHCOOC_3H_6C_nF_{2n+1}$
$CH_2=C(CH_3)COOC_3H_6C_nF_{2n+1}$
$CH_2=CHCOOC_4H_8C_nF_{2n+1}$
$CH_2=C(CH_3)COOC_4H_8C_nF_{2n+1}$
$CH_2=CHOOC_2H_4N(CH_3)SO_2C_nF_{2n+1}$
$CH_2=C(CH_3)COOC_2H_4N(CH_3)SO_2C_nF_{2n+1}$
$CH_2=CHCOOC_2H_4N(C_2H_5)SO_2C_nF_{2n+1}$
$CH_2=C(CH_3)COOC_2H_4N(C_2H_5)SO_2C_nF_{2n+1}$
$CH_2=CHCOOC_2H_4N(C_3H_7)SO_2C_nF_{2n+1}$
$CH_2=C(CH_3)COOC_2H_4N(C_3H_7)SO_2C_nF_{2n+1}$
$CH_2=CHCOOC_2H_4C_nF_{2n}CF(CF_3)_2$
$CH_2=C(CH_3)COOC_2H_4C_nF_{2n}CF(CF_3)_2$

Furthermore, preferred examples of the polymerizable non-fluorine atoms-containing monomer include (meth)acrylic acid esters represented by the general formula:

$$R_3OCOCR=CH_2$$

R: hydrogen atom or methyl group,
$R_3$: alkyl group, alkoxyalkyl group, cycloalkyl group, aryl group, or aralkyl group, for example, acrylic acid esters or methacrylic acid esters esterified by an alkyl group such as methyl, ethyl, propyl, isopropyl, n-butyl, n-hexyl, 2-ethylhexyl, n-octyl, lauryl, or stearyl; an alkoxyalkyl group such as methoxymethyl, 2-methoxyethyl, 2-ethoxyethyl, 2-butoxyethyl, or 3-ethoxypropyl; a cycloalkyl group such as cyclohexyl, an aryl group such as phenyl; or an aralkyl groups such as benzyl. In addition, monoalkyl esters or dialkyl esters of fumaric acid or maleic acid, such as monomethyl, dimethyl, monoethyl, diethyl, monopropyl, dipropyl, monobutyl, dibutyl, mono-2-ethylhexyl, di-2-ethylhexyl, monooctyl, or dioctyl esters thereof and vinyl esters such as vinyl acetate or vinyl caprylate are used. More preferred esters are alkyl(meth)acrylate having a long chain alkyl group having 8 or more carbon atoms, for example, an alkyl group such as 2-ethylhexyl, n-octyl, lauryl, or stearyl; a cycloalkyl group such as a cyclohexyl or an aralkyl group such as benzyl. In particular, stearyl (meth)acrylate and benzyl(meth)acrylate are preferably used, from the viewpoint of balanced coating ability, water-repellent ability, and oil-repellent ability to a substrate to be treated. Note that the term "(meth)acrylate" denotes acrylate or methacrylate.

In such a copolymer with another polymerizable monomer, it is preferable that the amount of the fluoroalkyl alcohol (meth)acrylic acid derivative monomer in the copolymer be about 5 wt % or more and preferably about 50 to 90 wt % from the viewpoint of expressing water- and oil-repellent properties. Even if the polymer is a homopolymer in which the amount of the monomer is 100 wt %, water- and oil-repellent properties are given. However, from the viewpoint of cost performance, a copolymer with another monomer is advantageous. In particular, from the viewpoints of both water- and oil-repellent properties and cost performance, it is preferable that the polyfluoroalkyl group-containing (meth)acrylate monomer showing water- and oil-repellent properties by itself is copolymerized in an amount of 50 to 90 wt % to the copolymer is preferred.

In the copolymer, another copolymerizable monomer can be copolymerized in a range that does not impaired the characteristics, for example, in a ratio of 30 wt % or less to the copolymer. Examples of the copolymerizable monomer include ethylene, styrene, vinylidene chloride, vinyl chloride, vinyl fluoride, vinylidene fluoride, vinyl toluene, α-methylstyrene, p-methylstyrene, vinyl naphthalene, acrylonitrile, methacrylonitrile, isoprene, pentadiene, butadiene, chloroprene, vinyl alkyl ether, halogenated alkyl vinyl ether, vinyl alkyl ketone, aziridinylethyl(meth)acrylate, aziridinyl(meth)acrylate, polysiloxane-containing (meth)acrylate, triallyl (iso)cyanurate, allyl glycidyl ether, allyl acetate, N-vinyl carbazole, maleimide, N-methyl maleimide, (2-dimethylamino)ethyl(meth)acrylate, hydroxyethyl(meth)acrylate, side-chain silicon-containing (meth)acrylate, urethane bond-containing (meth)acrylate, hydroxyethyl vinyl ether, or hydroxybutyl vinyl ether.

Furthermore, according to need, a polyfunctional monomer or oligomer can be copolymerized in a ratio of 30 wt % or less to the copolymer. Examples of the polyfunctional monomer or oligomer include ethyleneglycol di(meth)acrylate, propylene glycol di(meth)acrylate, 1,4-butanediol di(meth)acrylate, 1,6-hexanediol di(meth)acrylate, 1,9-nonanediol di(meth)acrylate, neopentylglycol di(meth)acrylate, tetraethyleneglycol di(meth)acrylate, tripropyleneglycol di(meth)acrylate, polypropyleneglycol di(meth)acrylate, bisphenol A ethylene oxide adduct diacrylate, dimethylol tricyclodecane diacrylate, glycerin methacrylate acrylate, or 3-acryloyloxy glycerin monomethacrylate.

On this occasion, together with a radical polymerization initiator, a cross-linkable group-containing monomer, for example, (meth)acrylamide, N-methylol(meth)acrylamide, N-methoxymethylacrylamide, N,N-dimethyl(meth)acrylamide, N-butoxymethyl acrylamide, diacetone(meth)acrylamide, methylolated diacetone(meth)acrylamide, or glycidyl (meth)acrylate, is added for copolymerization in a ratio of about 10 wt % or less, preferably, about 0.5 to 7 wt % to the copolymer. By copolymerizing the cross-linkable group-containing monomer, cross-linking with a hydroxyl group of a textile surface or self-cross-linking occurs to enhance the durability of a surface-modifying agent. Note that the term "(meth)acrylamide" denotes acrylamide or methacrylamide.

In the polymerization reaction, from the viewpoint of easiness in workability, the polymerization is preferably performed in an organic solvent composed of at least one fluorine-containing organic solvent such as 1,4-bis(trifluoromethyl)benzene, 1,1,1,2,2-pentafluoro-3,3-dichloropropane, 1,1,2,2,3-pentafluoro-1,3-dichloropropane, 1,1,1,2,3,4,4,5,5,5-decafluoropentane, or perfluorohexane or in an ester-based solvent such as ethyl acetate, in the presence of an organic peroxide, such as bis(4-tertiary butyl cyclohexyl)peroxydicarbonate, di-n-propyl peroxydicarbonate, or diisopropyl peroxydicarbonate, in a ratio of 1 to 4 wt %, preferably 1 to 2 wt % to the polymerizable monomer, at about 40 to 60° C. for about 15 to 30 hours.

The method for producing a homopolymers or copolymer of the fluoroalkyl alcohol (meth)acrylic acid derivative is not limited to the solution polymerization, and, for example, suspension polymerization or emulsion polymerization using water as the dispersion medium in the presence of a nonionic surfactant and/or a cationic surfactant may be employed.

The thus prepared homopolymer or copolymer of the fluoroalkyl alcohol (meth)acrylic acid derivative is isolated by a method of evaporation to dryness or aggregation by adding a flocculant such as an inorganic salt, followed by washing with a solvent or the like for purification. The resulting homopolymer or copolymer is subjected to high-performance liquid chromatography to confirm the weight-average molecular weight Mw, and the value is to be about 2000 to 20000000.

The polymer solution prepared by the solution polymerization is further diluted with a fluorine-containing organic solvent such as 1,4-bis(trifluoromethyl)benzene or 1,3-bis(trifluoromethyl)benzene, preferably with the same organic solvent as that used in the polymerization reaction, such that the solid content concentration is about 0.01 to 30 wt %, preferably about 0.05 to 5 wt %, and is used as a surface-modifying agent. The polymerization product prepared by aqueous emulsion polymerization or suspensions polymerization may be, directly or after dilution with water to a solid content concentration of about 0.1 to 10 wt %, prepared as an aqueous dispersion. Alternatively, the polymerization product may be prepared to an aqueous dispersion or an organic solvent solution by adding a flocculant to the polymerization reaction solution for aggregating the polymerization product and dispersing in water or dissolving in a fluorine-containing organic solvent and the homopolymer or copolymer isolated by washing the polymerization product with water or an organic solvent. The aqueous dispersion preferably containing a surfactant and a water-soluble organic solvent in a concentration of 20% or less is used. This aqueous dispersion or organic solvent solution can be used as, for example, a surface-modifying agent such as a water- and oil-repellent or an oil barrier.

The polymer solution composed of the aqueous dispersion or fluorine-containing organic solvent solution of the homopolymer or copolymer can further contain other additives that are necessary for the surface-modifying agent purpose, for example, a cross-linking agent such as a melamine resin, a urea resin, or blocked isocyanate; a polymer extender; another water repellent such as a silicone resin or oil, or wax; an insecticide; an antistatic agent; a dye stabilizer; a crease preventing agent; and a stain blocker.

The thus prepared surface-modifying agent can be effectively applied to, for example, metals, paper, films, fiber, fabric, woven fabric, carpet, or textile products made of filament, fiber, or yarn as a water- and oil-repellent, or effectively applied to, for example, sliding parts or parts near the sliding parts of precision instrument such as watches, motors, or lenses of single-lens reflex cameras as an oil barrier for preventing exudation of lubricant oil from a sliding face to the periphery. As the method for the application, coating, immersion, spray, padding, roll coating, or a combination thereof is usually employed. For example, the solid content concentration of a bath is adjusted to about 0.1 to 10 wt % and is used as a pad bath. A material to be treated is padded in the pad bath, and then the excessive solution is removed with a squeeze roll, followed by drying such that the amount of the polymer attached to the material to be treated is about 0.01 to 10 wt %. Subsequently, the drying of the material to be treated is usually performed at about 100 to 200° C. for about 1 minute to 2 hours to complete the water- and oil-repellent treatment, though it varies depending on the type of the material to be treated.

EXAMPLES

The present invention will be described with reference to examples below.

Reference Example 1

(1) In a 1200-mL autoclave equipped with a stirrer and a thermometer, 603g (1.17 mol) of

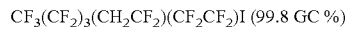
$CF_3(CF_2)_3(CH_2CF_2)(CF_2CF_2)I$ (99.8 GC %)

and 7 g of di-tertiary butyl peroxide were charged, and the autoclave was deaerated with a vacuum pump. When the inner temperature was increased to 80° C., ethylene was sequentially introduced into the autoclave to adjust the inner pressure to 0.5 MPa. When the inner pressure was decreased to 0.2 MPa, ethylene was introduced again to increase the inner pressure to 0.5 MPa. This process was repeated to introduce 49 g (1.7 mol) of ethylene over about 3 hours, while maintaining the inner temperature at 80 to 115° C. The content was collected at an inner temperature of 50° C. or lower to obtain 635 g (yield: 98.8%) of $CF_3(CF_2)_3(CH_2CF_2)(CF_2CF_2)(CH_2CH_2)I$
(98.3 GC %).

(2) In a 200-mL three-neck flask equipped with a condenser and a thermometer, 100 g (0.18 mol) of

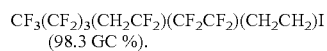
$CF_3(CF_2)_3(CH_2CF_2)(CF_2CF_2)(CH_2CH_2)I$
(98.3 GC %)

prepared in the above (1) and 100 g (1.68 mol) of N-methyl formamide were charged, followed by stirring at 150° C. for 4 hours. After the completion of the reaction, the reaction mixture was washed with 30 mL of water. The lower layer (82.8 g) was mixed with 83 g of a 15 wt % p-toluenesulfonic acid aqueous solution, followed by stirring at 80° C. for 8 hours. The reaction mixture was left standing, and then 60 g of a reaction product (78.4 GC %), being a transparent, colorless liquid at room temperature, was obtained as the lower layer (yield: 62.6%).

The reaction product was subjected to reduced pressure distillation under conditions of an inner pressure of 0.2 kPa, an inner temperature of 100 to 144° C., and a column top temperature of 58 to 59° C. to obtain 43.7 g (distillation yield: 88.2%) of a purified reaction product (95.4 GC %).

The resulting purified reaction product was confirmed by the results of $^1$H-NMR and $^{19}$F-NMR to be the compound represented by the following formula:

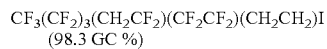
$CF_3(CF_2)_3(CH_2CF_2)(CF_2CF_2)(CH_2CH_2)OH$ $^1$H-NMR (CDCl$_3$, TMS): δ 2.89 (C$\underline{H_2}$CF$_2$)
2.35 (C$\underline{H_2}$CH$_2$)
3.95 (C$\underline{H_2}$CH$_2$)
2.61 (OH)
$^{19}$F-NMR (CDCl$_3$, C$_6$F$_6$): ppm −82.01 (C$\underline{F_3}$)
−126.71 (CF$_3$C$\underline{F_2}$CF$_2$CF$_2$)
−124.94 (CF$_3$C$\underline{F_2}$CF$_2$CF$_2$)
−113.08 (CF$_3$CF$_2$C$\underline{F_2}$CF$_2$)
−112.59 (CH$_2$CF$_2$CF$_2$C$\underline{F_2}$)
−126.82 (CH$_2$C$\underline{F_2}$CF$_2$CF$_2$)
−113.43 (CH$_2$CF$_2$C$\underline{F_2}$CF$_2$)

(3) 40.0 g (0.09 mol) of the reaction product (95.4 GC %) prepared in the above (2), 21 g of toluene, 1.7 g of p-toluenesulfonic acid, and 0.05 g of hydroquinone were charged in a 100-mL three-neck flask equipped with a condenser and a thermometer. After the inner temperature was increased to 100° C., 10.2 g (0.14 mol) of acrylic acid was added in the flask, followed by stirring at an inner temperature of 115° C. for 2 hours. After the completion of the reaction, 72 g of the reaction solution was collected after being cooled. Toluene was removed with an evaporator, and 44.5 g of the residue was washed with tap water to obtain 40.9 g (yield: 82.6%) of a reaction product (86.3 GC %), being a transparent, colorless liquid at room temperature, was obtained as the lower layer.

The reaction product was subjected to reduced pressure distillation under conditions of an inner pressure of 0.2 kPa, an inner temperature of 103 to 143° C., and a column top temperature of 60 to 61° C. to obtain 15.7 g (distillation yield: 44.1%) of a purified reaction product (99.2 GC %).

The resulting purified reaction product was confirmed by the results of $^1$H-NMR and $^{19}$F-NMR to be the compound represented by the following formula:

$CF_3(CF_2)_3(CH_2CF_2)(CF_2CF_2)(CH_2CH_2)$
$OCOCH=CH_2$ $^1$H-NMR (CDCl$_3$, TMS): δ 2.91 (C$\underline{H}_2$CF$_2$)
2.52 (C$\underline{H}_2$CH$_2$)
4.46 (C$\underline{H}_2$CH$_2$)
6.13 (CH=C$\underline{H}_2$)
6.41, 5.88 (CH=CH$_2$)
$^{19}$F-NMR (CDCl$_3$, C$_6$F$_6$): ppm −81.98 (C$\underline{F}_3$)
−126.71 (CF$_3$C$\underline{F}_2$CF$_2$CF$_2$)
−124.93 (CF$_3$C$\underline{F}_2$CF$_2$CF$_2$)
−113.00 (CF$_3$CF$_2$C$\underline{F}_2$CF$_2$)
−112.56 (CH$_2$CF$_2$CF$_2$C$\underline{F}_2$)
−126.71 (CH$_2$C$\underline{F}_2$CF$_2$CF$_2$)
−113.57 (CH$_2$CF$_2$C$\underline{F}_2$CF$_2$)

Reference Example 2

(4) A reaction for introducing 34 g (1.2 mol) of ethylene was performed, as in (1) of Reference Example 1, using 529 g (0.86 mol) of $CF_3(CF_2)_3(CH_2CF_2)(CF_2CF_2)_2I$ (99.9 GC %)

as the fluoroalkyl iodide and changing the amount of the di-tertiary butyl peroxide to 5 g to obtain 550 g (yield: 99.4%) of $CF_3(CF_2)_3(CH_2CF_2)(CF_2CF_2)_2(CH_2CH_2)I$
(99.1 GC %).

(5) In a 200-mL three-neck flask equipped with a condenser and a thermometer, 150 g (0.24 mol) of $CF_3(CF_2)_3(CH_2CF_2)(CF_2CF_2)_2(CH_2CH_2)I$
(99.1 GC %)

prepared in the above (4) and 105 g (1.78 mol) of N-methyl formamide were charged, followed by stirring at 150° C. for 5 hours. After the completion of the reaction, the reaction mixture was washed with 40 mL of water. The lower layer (132.3 g) was mixed with 135 g of a 15 wt % p-toluene-sulfonic acid aqueous solution, followed by stirring at 80° C. for 7 hours. The reaction mixture was left standing, and then 103 g (yield: 53.5%) of a reaction product (65.5 GC %), being a white solid, was obtained as the lower layer.

The reaction product was subjected to reduced pressure distillation under conditions of an inner pressure of 0.2 kPa, an inner temperature of 121 to 163° C., and a column top temperature of 76 to 77° C. to obtain 66.9 g (distillation yield: 94.2%) of a purified reaction product (95.3 GC %).

The resulting purified reaction product was confirmed by the results of $^1$H-NMR and $^{19}$F-NMR to be the compound represented by the following formula:

$CF_3(CF_2)_3(CH_2CF_2)(CF_2CF_2)_2(CH_2CH_2)OH$ $^1$H-NMR (CDCl$_3$, TMS): δ 2.91 (C$\underline{H}_2$CF$_2$)
2.39 (CH$_2$CH$_2$)
3.99 (C$\underline{H}_2$CH$_2$)
1.83 (OH)
$^{19}$F-NMR (CDCl$_3$, C$_6$F$_6$): ppm −82.11 (C$\underline{F}_3$)
−126.92 (CF$_3$C$\underline{F}_2$CF$_2$CF$_2$)
−125.11 (CF$_3$C$\underline{F}_2$CF$_2$CF$_2$)
−113.11, −113.17 (C$\underline{F}_2$CH$_2$CF$_2$)
−122.43 (CH$_2$CF$_2$C$\underline{F}_2$CF$_2$)
−124.49 (CH$_2$CF$_2$C$\underline{F}_2$CF$_2$)
−114.52 (CF$_2$CF$_2$CH$_2$C$\underline{H}_2$)
−124.94 (C$\underline{F}_2$CF$_2$CH$_2$CH$_2$)

(6) 60.0 g (0.11 mol) of the reaction product (95.4 GC %) prepared in the above (5), 29 g of toluene, 1.6 g of p-toluene-sulfonic acid, and 0.07 g of hydroquinone were charged in a 100-mL three-neck flask equipped with a condenser and a thermometer. After the inner temperature was increased to 100° C., 10 g (0.14 mol) of acrylic acid was added in the flask, followed by stirring at an inner temperature of 118° C. for 3 hours. After the completion of the reaction, 82 g of the reaction solution was collected after being cooled. Toluene was removed with an evaporator, and 63.9 g of the residue was washed with tap water to obtain 60.8 g (yield: 86.4%) of a reaction product (89.3 GC %), being a transparent, colorless liquid at room temperature, was obtained as the lower layer.

The reaction product was subjected to reduced pressure distillation under conditions of an inner pressure of 0.2 kPa, an inner temperature of 125 to 155° C., and a column top temperature of 84 to 86° C. to obtain 42.2 g (distillation yield: 77.2%) of a purified reaction product (99.4 GC %).

The resulting purified reaction product was confirmed by the results of $^1$H-NMR and $^{19}$F-NMR to be the compound represented by the following formula:

$CF_3(CF_2)_3(CH_2CF_2)(CF_2CF_2)_2(CH_2CH_2)$
$OCOCH=CH_2$ $^1$H-NMR (CDCl$_3$, TMS): δ 2.91 (C$\underline{H}_2$CF$_2$)
2.51 (CH$_2$CH$_2$)
4.46 (C$\underline{H}_2$CH$_2$)
6.13 (CH=C$\underline{H}_2$)
6.41, 5.88 (CH=CH$_2$)
$^{19}$F-NMR (CDCl$_3$, C$_6$F$_6$): ppm −81.95 (C$\underline{F}_3$)
−126.64 (CF$_3$C$\underline{F}_2$CF$_2$CF$_2$)
−124.80 (CF$_3$C$\underline{F}_2$CF$_2$CF$_2$)
−112.83 (CF$_2$CH$_2$C$\underline{F}_2$)
−122.05 (C$\underline{H}_2$CF$_2$CF$_2$CF$_2$)
−124.13 (CH$_2$C$\underline{F}_2$CF$_2$CF$_2$)
−114.36 (CF$_2$CF$_2$CH$_2$C$\underline{H}_2$)
−124.45 (C$\underline{F}_2$CF$_2$CH$_2$CH$_2$)

Reference Example 3

(7) A reaction for introducing 53 g (1.9 mol) of ethylene was performed, as in (1) of Reference Example 1, using 621 g (1.30 mol) of $CF_3(CF_2)_3(CH_2CF_2)_2I$ (99.1 GC %)

as the fluoroalkyl iodide and changing the amount of the di-tertiary butyl peroxide to 8 g to obtain 655 g (yield: 98.6%) of $CF_3(CF_2)_3(CH_2CF_2)_2(CH_2CH_2)I$ (98.2 GC %).

(8) In a 200-mL three-neck flask equipped with a condenser and a thermometer, 100 g (0.20 mol) of

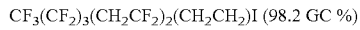
CF$_3$(CF$_2$)$_3$(CH$_2$CF$_2$)$_2$(CH$_2$CH$_2$)I (98.2 GC %)

prepared in the above (7) and 108 g (1.82 mol) of N-methyl formamide were charged, followed by stirring at 150° C. for 4 hours. After the completion of the reaction, the reaction mixture was washed with 30 mL of water. The lower layer (84.2 g) was mixed with 83 g of a 15 wt % p-toluenesulfonic acid aqueous solution, followed by stirring at 80° C. for 8 hours. The reaction mixture was left standing, and then 61 g (yield: 68.2%) of a reaction product (79.3 GC %), being a transparent, colorless liquid at room temperature, was obtained as the lower layer.

The reaction product was subjected to reduced pressure distillation under conditions of an inner pressure of 0.2 kPa, an inner temperature of 120 to 164° C., and a column top temperature of 68 to 69° C. to obtain 43.7 g (distillation yield: 86.2%) of a purified reaction product (95.4 GC %).

The resulting purified reaction product was confirmed by the results of $^1$H-NMR and $^{19}$F-NMR to be the compound represented by the following formula:

CF$_3$(CF$_2$)$_3$(CH$_2$CF$_2$)$_2$(CH$_2$CH$_2$)OH $^1$H-NMR (CDCl$_3$, TMS): δ 2.83 (CF$_2$C$\underline{H}_2$CF$_2$CH$_2$)
3.44 (CF$_2$CH$_2$CF$_2$C$\underline{H}_2$)
2.39 (C$\underline{H}_2$CH$_2$)
3.99 (C$\underline{H}_2$CH$_2$)
3.47 (OH)
$^{19}$F-NMR (CDCl$_3$, C$_6$F$_6$): ppm −82.1 (C$\underline{F}_3$)
−126.4 (CF$_3$C$\underline{F}_2$CF$_2$CF$_2$)
−125.6 (CF$_3$CF$_2$C$\underline{F}_2$CF$_2$)
−113.7 (CF$_3$CF$_2$CF$_2$C$\underline{F}_2$)
−101.1 (C$\underline{H}_2$CF$_2$CH$_2$C$\underline{F}_2$)
−105.2 (CH$_2$C$\underline{F}_2$CH$_2$CF$_2$)

(9) 40.0 g (0.10 mol) of the reaction product (95.4 GC %) prepared in the above (8), 22 g of toluene, 1.8 g of p-toluenesulfonic acid, and 0.05 g of hydroquinone were charged in a 100-mL three-neck flask equipped with a condenser and a thermometer. After the inner temperature was increased to 100° C., 10.5 g (0.14 mol) of acrylic acid was added in the flask, followed by stirring at an inner temperature of 115° C. for 2 hours. After the completion of the reaction, 74 g of the reaction solution was collected after being cooled. Toluene was removed with an evaporator, and 45.2 g of the residue was washed with tap water to obtain 40.7 g (yield: 83.1%) of a reaction product (87.4 GC %), being a transparent, colorless liquid at room temperature, was obtained as the lower layer.

The reaction product was subjected to reduced pressure distillation under conditions of an inner pressure of 0.2 kPa, an inner temperature of 123 to 163° C., and a column top temperature of 71 to 72° C. to obtain 16.1 g (distillation yield: 44.9%) of a purified reaction product (99.3 GC %).

The resulting purified reaction product was confirmed by the results of $^1$H-NMR and $^{19}$F-NMR to be the compound represented by the following formula:

CF$_3$(CF$_2$)$_3$(CH$_2$CF$_2$)$_2$(CH$_2$CH$_2$)OCOCH=CH$_2$ $^1$H-NMR (CDCl$_3$, TMS): δ 2.83 (CF$_2$C$\underline{H}_2$CF$_2$CH$_2$)
3.45 (CF$_2$CH$_2$CF$_2$C$\underline{H}_2$)
2.52 (C$\underline{H}_2$CH$_2$)
4.45 (C$\underline{H}_2$CH$_2$)
6.13 (CH=C$\underline{H}_2$)
6.41, 5.88 (CH=C$\underline{H}_2$)
$^{19}$F-NMR (CDCl$_3$, C$_6$F$_6$): ppm −82.1 (C$\underline{F}_3$)
−126.3 (CF$_3$C$\underline{F}_2$CF$_2$CF$_2$)
−125.6 (CF$_3$CF$_2$C$\underline{F}_2$CF$_2$)
−113.7 (CF$_3$CF$_2$CF$_2$C$\underline{F}_2$)
−101.3 (CH$_2$CF$_2$C$\underline{H}_2$CF$_2$)
−105.1 (CH$_2$C$\underline{F}_2$CH$_2$C$\underline{F}_2$)

Example 1

Ten grams of the final reaction product (99.2 GC %)

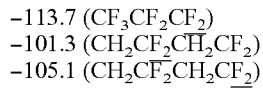
CF$_3$(CF$_2$)$_3$(CH$_2$CF$_2$)(CF$_2$CF$_2$)(CH$_2$CH$_2$)OCOCH=CH$_2$ prepared in Reference Example 1, 35 g of 1,4-bis(trifluoromethyl)benzene, and 0.16 g of bis(4-tertiary butyl cyclohexyl) peroxydicarbonate were charged in a 50-mL round-bottom flask equipped with a condenser, followed by polymerization reaction at 50° C. for 16 hours, while stirring with a magnet stirrer to obtain a polymer solution having a solid content concentration of 21.6 wt %.

The used polymer solution was put in an oven at 120° C. to remove the solvent. The isolated fluorine-containing polymer had a weight-average molecular weight Mw of 30000. Here, the weight-average molecular weight Mw was measured by GPC measurement using Shodex GPC KD806 M+KD-802+KD-G at 40° C. with an eluate of 10 mM THF at an elution rate of 1 mL/min. A differential refractometer was used as the detector, and the analysis was performed by Labchat 180 (polystyrene conversion) manufactured by SIC.

Example 2

A polymer solution having a solid content concentration of 21.3 wt % was prepared, as in Example 1, using the final reaction product (99.4 GC %)

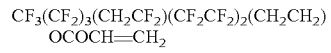
CF$_3$(CF$_2$)$_3$(CH$_2$CF$_2$)(CF$_2$CF$_2$)$_2$(CH$_2$CH$_2$)OCOCH=CH$_2$ prepared in Reference Example 2, instead of the final reaction product prepared in Reference Example 1, in the same amount. The weight-average molecular weight Mw of the fluorine-containing polymer prepared herein was 35000.

Example 3

A polymer solution of 21.2 wt % was prepared, as in Example 1, using the final reaction product (99.3 GC %):

CF$_3$(CF$_2$)$_3$(CH$_2$CF$_2$)$_2$(CH$_2$CH$_2$)OCOCH=CH$_2$ prepared in Reference Example 3, instead of the final reaction product prepared in Reference Example 1, in the same amount. The weight-average molecular weight Mw of the fluorine-containing polymer prepared herein was 20000.

Comparative Examples 1 to 3

A polymerization reaction was performed, as in Example 1, using:

C$_n$F$_{2n+1}$(CH$_2$CH$_2$)OCOCH=CH$_2$ n:4 (Comparative Example 1),
n:6 (Comparative Example 2), or
n:8 (Comparative Example 3),
instead of the final reaction product prepared in Reference Example 1, in the same molar amount, to obtain polymer solutions having a solid content concentration of 21.3 wt %.

Each of the polymer solutions prepared in Examples 1 to 3 and Comparative Examples 1 to 3 was diluted with 1,4-bis (trifluoromethyl)benzene so as to have a solid content concentration of 2 wt %. The static contact angle as an index of water- and oil-repellent performance was measured for various types of organic solvents and water.

Measurement of static contact angle: One milliliter of the diluted polymer solution was applied to a stainless steel plate of 2×5 cm, followed by drying at 50° C. for 30 minutes to produce a test plate. The static contact angles of the various types of organic solvents and water on the surface of the produced plate were measured by a sessile drop method with a droplet-type projection contact angle meter manufactured by Kyowa Interface Science Co., Ltd.

The obtained results are shown in Table 1 below. It was confirmed that the static contact angle in each Example showed the same performance as that in Comparative Example 3 (n=8).

TABLE 1

| Example | Heptane | Octane | Decane | Dodecane | Tetradecane | Water |
|---|---|---|---|---|---|---|
| Example 1 | 45° | 48° | 58° | 65° | 76° | 118° |
| Example 2 | 58° | 61° | 66° | 70° | 75° | 120° |
| Example 3 | 36° | 41° | 52° | 58° | 71° | 115° |
| Comparative Example 1 | 36° | 40° | 52° | 59° | 71° | 114° |
| Comparative Example 2 | 42° | 48° | 56° | 64° | 79° | 118° |
| Comparative Example 3 | 58° | 60° | 66° | 72° | 78° | 120° |

Example 4

Forty grams (0.07 mol) of the final reaction product (99.4 GC %)

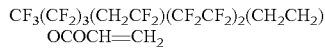
$CF_3(CF_2)_3(CH_2CF_2)(CF_2CF_2)_2(CH_2CH_2)OCOCH=CH_2$ prepared in Reference Example 2, 10 g (0.06 mol) of benzyl methacrylate [BzMA], 200 g of perfluorohexane $C_6F_{14}$ serving as a polymerization solvent, and 0.7 g of bis(4-tertiary butyl cyclohexyl)peroxydicarbonate were charged in a 250-mL round-bottom flask equipped with a condenser, followed by a polymerization reaction at 50° C. for 21 hours, while stirring with a magnet stirrer to obtain a copolymer solution having a solid content concentration of 19.8 wt %. The weight-average molecular weight Mw of the resulting fluorine-containing copolymer measured as in Example 1 was 36000. The copolymerization ratio measured by $^1$H-NMR confirmed that the content of BzMA in the copolymer was 45.3 mol %.

Reference Example 4

(10) As in (1) of Reference Example 1, using 712 g (1.17 mols) of $CF_3(CF_2)(CH_2CF_2)(CF_2CF_2)_3I$ (99.7 GC %)

as the fluoroalkyl iodide, 754 g (yield: 99.6%) of

$CF_3(CF_2)(CH_2CF_2)(CF_2CF_2)_3(CH_2CH_2)I$
(98.3 GC %)

was obtained.

(11) In a 200-mL three-neck flask equipped with a condenser and a thermometer, 113 g (0.18 mol) of

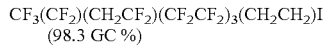
$CF_3(CF_2)(CH_2CF_2)(CF_2CF_2)_3(CH_2CH_2)I$
(98.3 GC %)

prepared in the above (10) and 100 g (1.68 mol) of N-methyl formamide were charged, followed by stirring at 150° C. for 4 hours. After the completion of the reaction, the reaction mixture was washed with 30 mL of water. The lower layer (103 g) was mixed with 83 g of a 15 wt % p-toluenesulfonic acid aqueous solution, followed by stirring at 80° C. for 8 hours. The reaction mixture was left standing, and then 73 g (yield: 55.1%) of a reaction product (70.5 GC %), being a transparent, colorless liquid at room temperature, was obtained as the lower layer.

The reaction product was subjected to reduced pressure distillation under conditions of an inner pressure of 0.2 kPa, an inner temperature of 126 to 165° C., and a column top temperature of 75 to 78° C. to obtain 45.2 g (distillation yield: 84.2%) of a purified reaction product (95.9 GC %).

The resulting purified reaction product was confirmed by the results of $^1$H-NMR and $^{19}$F-NMR to be the compound represented by the following formula:

$CF_3(CF_2)(CH_2CF_2)(CF_2CF_2)_3(CH_2CH_2)OH$ $^1$H-NMR (CDCl$_3$, TMS): δ 2.83 (C$\underline{H}_2$CF$_2$)
2.39 (C$\underline{H}_2$CH$_2$)
3.99 (C$\overline{H}_2$CH$_2$)
1.83 (OH)
$^{19}$F-NMR (CDCl$_3$, C$_6$F$_6$): ppm −87.1 (C$\underline{F}_3$)
−116.8 (CF$_3$C$\underline{F}_2$)
−113.1 (CH$_2$C$\overline{F}_2$CF$_2$CF$_2$CF$_2$CF$_2$CF$_2$CF$_2$)
−122.9 (CF$_3$C$\overline{F}_2$C$\underline{F}_2$CF$_2$CF$_2$CF$_2$CF$_2$CF$_2$)
−122.6 (CH$_2$CF$_2$C$\overline{F}_2$CF$_2$CF$_2$CF$_2$CF$_2$CF$_2$)
−122.6 (CH$_2$CF$_2$CF$_2$C$\overline{F}_2$CF$_2$CF$_2$CF$_2$CF$_2$)
−124.2 (CH$_2$CF$_2$CF$_2$CF$_2$C$\overline{F}_2$CF$_2$CF$_2$CF$_2$)
−124.7 (CH$_2$CF$_2$CF$_2$CF$_2$CF$_2$C$\overline{F}_2$CF$_2$CF$_2$)
−144.4 (CH$_2$CF$_2$CF$_2$CF$_2$CF$_2$CF$_2$C$\overline{F}_2$CF$_2$)

(12) 41.0 g (0.08 mol) of the reaction product (95.9 GC %) prepared in the above (11), 21 g of toluene, 1.7 g of p-toluenesulfonic acid, and 0.05 g of hydroquinone were charged in a 100-mL three-neck flask equipped with a condenser and a thermometer. After the inner temperature was increased to 100° C., 10.1 g (0.14 mol) of acrylic acid was added in the flask, followed by stirring at an inner temperature of 115° C. for 2 hours. After the completion of the reaction, 75 g of the reaction solution was collected after being cooled. Toluene was removed with an evaporator, and 43.0 g of the residue was washed with tap water to obtain 45.3 g (yield: 88.8%) of a reaction product (87.6 GC %), being a transparent, colorless liquid at room temperature, was obtained as the lower layer.

The reaction product was subjected to reduced pressure distillation under conditions of an inner pressure of 0.2 kPa, an inner temperature of 125 to 160° C., and a column top temperature of 85 to 87° C. to obtain 18.9 g (distillation yield: 47.4%) of a purified reaction product (99.5 GC %).

The resulting purified reaction product was confirmed by the results of $^1$H-NMR and $^{19}$F-NMR to be the compound represented by the following formula:

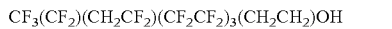
$CF_3(CF_2)(CH_2CF_2)(CF_2CF_2)_3(CH_2CH_2)OCOCH=CH_2$ $^1$H-NMR (CDCl$_3$, TMS): δ 2.88 (C$\underline{H}_2$CF$_2$)
2.51 (C$\underline{H}_2$CH$_2$)
4.46 (C$\overline{H}_2$CH$_2$)
6.13 (CH=C$\overline{H}_2$)
6.41, 5.$\overline{88}$ (C$\underline{H}$=CH$_2$)
$^{19}$F-NMR (CDCl$_3$, $\overline{C}_6$F$_6$): ppm −87.0 (C$\underline{F}_3$)
−116.7 (CF$_3$C$\underline{F}_2$)
−112.8 (CH$_2$C$\overline{F}_2$CF$_2$CF$_2$CF$_2$CF$_2$CF$_2$CF$_2$)
−122.7 (CH$_2$C$\overline{F}_2$C$\underline{F}_2$CF$_2$CF$_2$CF$_2$CF$_2$CF$_2$)
−122.3 (CH$_2$CF$_2$C$\overline{F}_2$CF$_2$CF$_2$CF$_2$CF$_2$CF$_2$)
−122.3 (CH$_2$CF$_2$CF$_2$C$\overline{F}_2$CF$_2$CF$_2$CF$_2$CF$_2$)
−123.9 (CH$_2$CF$_2$CF$_2$CF$_2$C$\overline{F}_2$CF$_2$CF$_2$CF$_2$)
−124.3 (CH$_2$CF$_2$CF$_2$CF$_2$CF$_2$C$\overline{F}_2$CF$_2$CF$_2$)
−144.3 (CH$_2$CF$_2$CF$_2$CF$_2$CF$_2$CF$_2$C$\overline{F}_2$CF$_2$)

Reference Example 5

(13) As in (1) of Reference Example 1, using 670 g (1.17 mols) of $$CF_3(CF_2)(CH_2CF_2)_2(CF_2CF_2)_2I \text{ (99.8 GC \%)}$$

as the fluoroalkyl iodide, 711 g (yield: 99.5%) of $$CF_3(CF_2)(CH_2CF_2)_2(CF_2CF_2)_2(CH_2CH_2)I \text{ (98.4 GC \%)}$$

was obtained.

(14) In a 200-mL three-neck flask equipped with a condenser and a thermometer, 107 g (0.18 mol) of $$CF_3(CF_2)(CH_2CF_2)_2(CF_2CF_2)_2(CH_2CH_2)I \text{ (98.4 GC \%)}$$

prepared in the above (13) and 100 g (1.68 mol) of N-methyl formamide were charged, followed by stirring at 150° C. for 4 hours. After the completion of the reaction, the reaction mixture was washed with 30 mL of water. The lower layer (83 g) was mixed with 83 g of a 15 wt % p-toluenesulfonic acid aqueous solution, followed by stirring at 80° C. for 8 hours. The reaction mixture was left standing, and then 66 g (yield: 57.2%) of a reaction product (75.6 GC %), being a white solid, was obtained as the lower layer.

The reaction product was subjected to reduced pressure distillation under conditions of an inner pressure of 0.2 kPa, an inner temperature of 123 to 163° C., and a column top temperature of 72 to 74° C. to obtain 44.6 g (distillation yield: 84.7%) of a purified reaction product (94.8 GC %).

The resulting purified reaction product was confirmed by the results of $^1$H-NMR and $^{19}$F-NMR to be the compound represented by the following formula:

$$CF_3(CF_2)(CH_2CF_2)_2(CF_2CF_2)_2(CH_2CH_2)OH$$

$^1$H-NMR (CDCl$_3$, TMS): δ 2.83 (C$\underline{H}_2$CF$_2$CH$_2$CF$_2$)
2.86 (CH$_2$CF$_2$C$\underline{H}_2$CF$_2$)
2.37 (C$\underline{H}_2$CH$_2$)
3.96 (C$\underline{H}_2$CH$_2$)
2.59 (OH)
$^{19}$F-NMR (CDCl$_3$, C$_6$F$_6$): ppm −87.0 (C$\underline{F}_3$)
−116.7 (CF$_3$C$\underline{F}_2$)
−112.3 (CH$_2$C$\underline{F}_2$CH$_2$CF$_2$)
−113.0 (CH$_2$C$\underline{F}_2$CH$_2$CF$_2$)
−121.4 (CF$_2$CF$_2$CF$_2$C$\underline{F}_2$CH$_2$)
−124.3 (C$\underline{F}_2$CF$_2$CF$_2$CF$_2$CH$_2$)
−124.7 (CF$_2$C$\underline{F}_2$CF$_2$CF$_2$CH$_2$)
−114.3 (CF$_2$CF$_2$C$\underline{F}_2$CF$_2$CH$_2$)

(15) 42 g (0.09 mol) of the reaction product (94.8 GC %) prepared in the above (14), 21 g of toluene, 1.7 g of p-toluenesulfonic acid, and 0.05 g of hydroquinone were charged in a 100-mL three-neck flask equipped with a condenser and a thermometer. After the inner temperature was increased to 100° C., 10.1 g (0.14 mol) of acrylic acid was added in the flask, followed by stirring at an inner temperature of 115° C. for 2 hours. After the completion of the reaction, 71 g of the reaction solution was collected after being cooled. Toluene was removed with an evaporator, and 45.1 g of the residue was washed with tap water to obtain 43.8 g (yield: 81.0%) of a reaction product (86.2 GC %), being a transparent, colorless liquid at room temperature, was obtained as the lower layer.

The reaction product was subjected to reduced pressure distillation under conditions of an inner pressure of 0.2 kPa, an inner temperature of 122 to 160° C., and a column top temperature of 86 to 88° C. to obtain 15.6 g (distillation yield: 41.0%) of a purified reaction product (99.2 GC %).

The resulting purified reaction product was confirmed by the results of $^1$H-NMR and $^{19}$F-NMR to be the compound represented by the following formula:

$$CF_3(CF_2)(CH_2CF_2)_2(CF_2CF_2)_2(CH_2CH_2)\\OCOCH=CH_2$$

$^1$H-NMR (CDCl$_3$, TMS): δ 2.86 (C$\underline{H}_2$CF$_2$CH$_2$CF$_2$)
2.88 (CH$_2$CF$_2$C$\underline{H}_2$CF$_2$)
2.51 (C$\underline{H}_2$CH$_2$)
4.46 (C$\underline{H}_2$CH$_2$)
6.13 (CH=C$\underline{H}_2$)
6.41, 5.88 (C$\underline{H}$=CH$_2$)
$^{19}$F-NMR (CDCl$_3$, C$_6$F$_6$): ppm −87.0 (C$\underline{F}_3$)
−116.7 (CF$_3$C$\underline{F}_2$)
−114.8 (CH$_2$C$\underline{F}_2$CH$_2$CF$_2$)
−112.9 (CH$_2$C$\underline{F}_2$CH$_2$CF$_2$)
−122.1 (CF$_2$CF$_2$CF$_2$C$\underline{F}_2$CH$_2$)
−124.5 (C$\underline{F}_2$CF$_2$CF$_2$CF$_2$CH$_2$)
−124.7 (CF$_2$C$\underline{F}_2$CF$_2$CF$_2$CH$_2$)
−114.4 (CF$_2$CF$_2$C$\underline{F}_2$CF$_2$CH$_2$)

Reference Example 6

(16) As in (1) of Reference Example 1, using 670 g (1.17 mol) of $$CF_3(CF_2)_3(CH_2CF_2)_2(CF_2CF_2)I \text{ (99.7 GC \%)}$$

as the fluoroalkyl iodide, 706 g 99.0%) of $$CF_3(CF_2)_3(CH_2CF_2)_2(CF_2CF_2)(CH_2CH_2)I \text{ (98.5 GC \%)}$$

was obtained.

(17) In a 200-mL three-neck flask equipped with a condenser and a thermometer, 107 g (0.18 mol) of $$CF_3(CF_2)_3(CH_2CF_2)_2(CF_2CF_2)(CH_2CH_2)I \\ \text{(98.5 GC \%)}$$

prepared in the above (16) and 100 g (1.68 mol) of N-methyl formamide were charged, followed by stirring at 150° C. for 4 hours. After the completion of the reaction, the reaction mixture was washed with 30 mL of water. The lower layer (82 g) was mixed with 83 g of a 15 wt % p-toluenesulfonic acid aqueous solution, followed by stirring at 80° C. for 8 hours. The reaction mixture was left standing, and then 65 g (yield: 55.0%) of a reaction product (73.8 GC %), being a white solid, was obtained as the lower layer.

The reaction product was subjected to reduced pressure distillation under conditions of an inner pressure of 0.2 kPa, an inner temperature of 126 to 167° C., and a column top temperature of 75 to 76° C. to obtain 44.1 g (distillation yield: 87.5%) of a purified reaction product (95.2 GC %).

The resulting purified reaction product was confirmed by the results of $^1$H-NMR and $^{19}$F-NMR to be the compound represented by the following formula:

$$CF_3(CF_2)_3(CH_2CF_2)_2(CF_2CF_2)(CH_2CH_2)OH$$

$^1$H-NMR (CDCl$_3$, TMS): δ 2.84 (C$\underline{H}_2$CF$_2$CH$_2$CF$_2$)
2.89 (CH$_2$CF$_2$C$\underline{H}_2$CF$_2$)
2.35 (C$\underline{H}_2$CH$_2$)
3.95 (C$\underline{H}_2$CH$_2$)
2.61 (OH)
$^{19}$F-NMR (CDCl$_3$, C$_5$F$_s$): ppm −82.0 (C$\underline{F}_3$)
−126.7 (CF$_3$C$\underline{F}_2$CF$_2$CF$_2$)
−124.9 (CF$_3$C$\underline{F}_2$CF$_2$CF$_2$)
−113.1 (CF$_3$CF$_2$C$\underline{F}_2$CF$_2$)
−112.4 (CH$_2$CF$_2$CH$_2$C$\underline{F}_2$)
−112.6 (CH$_2$C$\underline{F}_2$CH$_2$CF$_2$)
−126.8 (CH$_2$CF$_2$CF$_2$C$\underline{F}_2$)
−113.4 (CH$_2$CF$_2$C$\underline{F}_2$CF$_2$)

(18) 42 g (0.09 mol) of the reaction product (95.2 GC %) prepared in the above (17), 21 g of toluene, 1.7 g of p-toluenesulfonic acid, and 0.05 g of hydroquinone were charged in a 100-mL three-neck flask equipped with a condenser and a thermometer. After the inner temperature was increased to 100° C., 10.1 g (0.14 mol) of acrylic acid was added in the flask, followed by stirring at an inner temperature of 115° C. for 2 hours. After the completion of the reaction, 69 g of the reaction solution was collected after being cooled. Toluene was removed with an evaporator, and 43.1 g of the residue was washed with tap water to obtain 44.5 g (yield: 81.7%) of a reaction product (85.9 GC %), being a transparent, colorless liquid at room temperature, was obtained as the lower layer.

The reaction product was subjected to reduced pressure distillation under conditions of an inner pressure of 0.2 kPa, an inner temperature of 125 to 158° C., and a column top temperature of 85 to 86° C. to obtain 15.7 g (distillation yield: 40.7%) of a purified reaction product (99.0 GC %).

The resulting purified reaction product was confirmed by the results of $^1$H-NMR and $^{19}$F-NMR to be the compound represented by the following formula:

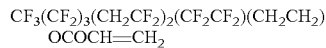
$CF_3(CF_2)_3(CH_2CF_2)_2(CF_2CF_2)(CH_2CH_2)$
$OCOCH=CH_2$ $^1$H-NMR (CDCl$_3$, TMS): δ 2.88 (C$\underline{H}_2$CF$_2$CH$_2$CF$_2$)
2.91 (CH$_2$CF$_2$C$\underline{H}_2$CF$_2$)
2.52 (C$\underline{H}_2$CH$_2$)
4.46 (C$\underline{H}_2$CH$_2$)
6.13 (C$\underline{H}$=CH$_2$)
6.41, 5.88 (CH=C$\underline{H}_2$)
$^{19}$F-NMR (CDCl$_3$, C$_6$F$_6$): ppm −81.9 (C$\underline{F}_3$)
−126.7 (CF$_3$C$\underline{F}_2$CF$_2$CF$_2$)
−124.9 (CF$_3$CF$_2$C$\underline{F}_2$CF$_2$)
−113.0 (CF$_3$CF$_2$CF$_2$C$\underline{F}_2$)
−112.4 (CH$_2$C$\underline{F}_2$CH$_2$CF$_2$)
−112.6 (CH$_2$CF$_2$CH$_2$C$\underline{F}_2$)
−126.7 (CH$_2$CF$_2$CF$_2$C$\underline{F}_2$)
−113.6 (CH$_2$CF$_2$C$\underline{F}_2$CF$_2$)

Reference Example 7

(19) As in (1) of Reference Example 1, using 594 g (1.17 mol) of

CF$_3$(CF$_2$)(CH$_2$CF$_2$)(CF$_2$CF$_2$)$_2$I (99.6 GC %)

as the fluoroalkyl iodide, 627 g (yield: 98.9%) of

CF$_3$(CF$_2$)(CH$_2$CF$_2$)(CF$_2$CF$_2$)$_2$(CH$_2$CH$_2$)I
(98.9 GC %)

was obtained.

(20) In a 200-mL three-neck flask equipped with a condenser and a thermometer, 95.8 g (0.18 mol) of

CF$_3$(CF$_2$)(CH$_2$CF$_2$)(CF$_2$CF$_2$)$_2$(CH$_2$CH$_2$)I
(98.9 GC %)

prepared in the above (19) and 100 g (1.68 mol) of N-methyl formamide were charged, followed by stirring at 150° C. for 4 hours. After the completion of the reaction, the reaction mixture was washed with 30 mL of water. The lower layer (82 g) was mixed with 83 g of a 15 wt % p-toluenesulfonic acid aqueous solution, followed by stirring at 80° C. for 8 hours. The reaction mixture was left standing, and 62 g (yield: 62.1%) of a reaction product (76.4 GC %), being a white solid, was obtained as the lower layer.

The reaction product was subjected to reduced pressure distillation under conditions of an inner pressure of 0.2 kPa, an inner temperature of 100 to 157° C., and a column top temperature of 59 to 61° C. to obtain 42.6 g (distillation yield: 85.3%) of a purified reaction product (94.9 GC %).

The resulting purified reaction product was confirmed by the results of $^1$H-NMR and $^{19}$F-NMR to be the compound represented by the following formula:

CF$_3$(CF$_2$)(CH$_2$CF$_2$)(CF$_2$CF$_2$)$_2$(CH$_2$CH$_2$)OH $^1$H-NMR (CDCl$_3$, TMS):δ 2.37 (C$\underline{H}_2$CH$_2$)
3.96 (CH$_2$C$\underline{H}_2$)
2.59 (OH)
$^{19}$F-NMR (CDCl$_3$, C$_6$F$_6$): ppm −87.0 (C$\underline{F}_3$)
−116.7 (CF$_3$C$\underline{F}_2$)
−113.0 (CH$_2$C$\underline{F}_2$CF$_2$CF$_2$CF$_2$CF$_2$)
−121.4 (CH$_2$CF$_2$C$\underline{F}_2$CF$_2$CF$_2$CF$_2$)
−124.3 (CH$_2$CF$_2$CF$_2$C$\underline{F}_2$CF$_2$CF$_2$)
−124.7 (CH$_2$CF$_2$CF$_2$CF$_2$C$\underline{F}_2$CF$_2$)
−114.3 (CH$_2$CF$_2$CF$_2$CF$_2$CF$_2$C$\underline{F}_2$)

(21) 37 g (0.09 mol) of the reaction product (94.9 GC %) prepared in the above (20), 21 g of toluene, 1.7 g of p-toluenesulfonic acid, and 0.05 g of hydroquinone were charged in a 100-mL three-neck flask equipped with a condenser and a thermometer. After the inner temperature was increased to 100° C., 10.1 g (0.14 mol) of acrylic acid was added in the flask, followed by stirring at an inner temperature of 115° C. for 2 hours. After the completion of the reaction, 74 g of the reaction solution was collected after being cooled. Toluene was removed with an evaporator, and 43.9 g of the residue was washed with tap water to obtain 40.8 g (yield: 85.4%) of a reaction product (86.2 GC %), being a transparent, colorless liquid at room temperature, was obtained as the lower layer.

The reaction product was subjected to reduced pressure distillation under conditions of an inner pressure of 0.2 kPa, an inner temperature of 114 to 155° C., and a column top temperature of 66 to 69° C. to obtain 13.8 g (distillation yield: 38.9%) of a purified reaction product (99.1 GC %).

The resulting purified reaction product was confirmed by the results of $^1$H-NMR and $^{19}$F-NMR to be the compound represented by the following formula:

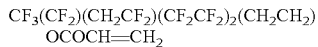
CF$_3$(CF$_2$)(CH$_2$CF$_2$)(CF$_2$CF$_2$)$_2$(CH$_2$CH$_2$)
OCOCH=CH$_2$ $^1$H-NMR (CDCl$_3$, TMS): δ 2.88 (C$\underline{H}_2$CF$_2$)
2.51 (C$\underline{H}_2$CH$_2$)
4.46 (C$\underline{H}_2$CH$_2$)
6.13 (C$\underline{H}$=CH$_2$)
6.41, 5.89 (CH=C$\underline{H}_2$)
$^{19}$F-NMR (CDCl$_3$, C$_6$F$_6$): ppm −87.0 (C$\underline{F}_3$)
−116.7 (CF$_3$C$\underline{F}_2$)
−112.9 (CH$_2$C$\underline{F}_2$CF$_2$CF$_2$CF$_2$)
−122.1 (CH$_2$CF$_2$C$\underline{F}_2$CF$_2$CF$_2$CF$_2$)
−124.5 (CH$_2$CF$_2$CF$_2$C$\underline{F}_2$CF$_2$CF$_2$)
−124.7 (CH$_2$CF$_2$CF$_2$CF$_2$C$\underline{F}_2$CF$_2$)
−114.4 (CH$_2$CF$_2$CF$_2$CF$_2$CF$_2$C$\underline{F}_2$)

Reference Example 8

(22) As in (1) of Reference Example 1, using 554 g (1.17 mol) of

CF$_3$(CF$_2$)(CH$_2$CF$_2$)$_2$(CF$_2$CF$_2$)I (99.8 GC %)

as the fluoroalkyl iodide, 587 g (yield: 99.2%) of

CF$_3$(CF$_2$)(CH$_2$CF$_2$)$_2$(CF$_2$CF$_2$)(CH$_2$CH$_2$)I (99.1 GC %)

was obtained.

(23) In a 200-mL three-neck flask equipped with a condenser and a thermometer, 90 g (0.18 mol) of

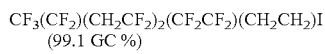
(99.1 GC %)

prepared in the above (22) and 100 g (1.68 mol) of N-methyl formamide were charged, followed by stirring at 150° C. for 4 hours. After the completion of the reaction, the reaction mixture was washed with 30 mL of water. The lower layer (83 g) was mixed with 83 g of a 15 wt % p-toluenesulfonic acid aqueous solution, followed by stirring at 80° C. for 8 hours. The reaction mixture was left standing, and then 56 g (yield: 60.3%) of a reaction product (75.3 GC %), being a white solid, was obtained as the lower layer.

The reaction product was subjected to reduced pressure distillation under conditions of an inner pressure of 0.2 kPa, an inner temperature of 103 to 155° C., and a column top temperature of 56 to 57° C. to obtain 38.0 g (distillation yield: 85.9%) of a purified reaction product (95.3 GC %).

The resulting purified reaction product was confirmed by the results of $^1$H-NMR and $^{19}$F-NMR to be the compound represented by the following formula:

$CF_3(CF_2)(CH_2CF_2)_2(CF_2CF_2)(CH_2CH_2)OH$ $^1$H-NMR (CDCl$_3$, TMS): δ 2.82 ($\underline{CH_2}CF_2CH_2CF_2$)
2.85 ($CH_2CF_2\underline{CH_2}CF_2$)
2.33 ($\underline{CH_2}CH_2$)
3.92 ($C\underline{H_2}CH_2$)
3.38 (OH)

$^{19}$F-NMR (CDCl$_3$, C$_6$F$_6$): ppm −87.0 (C$\underline{F_3}$)
−116.7 (CF$_3$C$\underline{F_2}$)
−112.6 (CH$_2$C$\underline{F_2}$CH$_2$CF$_2$)
−112.9 (CH$_2$C$\underline{F_2}$CF$_2$CF$_2$)
−124.7 (CH$_2$CF$_2$C$\underline{F_2}$CF$_2$)
−114.3 (CH$_2$CF$_2$CF$_2$C$\underline{F_2}$)

(24) 34 g (0.09 mol) of the reaction product (95.3 GC %) prepared in the above (23), 21 g of toluene, 1.7 g of p-toluenesulfonic acid, and 0.05 g of hydroquinone were charged in a 100-mL three-neck flask equipped with a condenser and a thermometer. After the inner temperature was increased to 100° C., 10.1 g (0.14 mol) of acrylic acid was added in the flask, followed by stirring at an inner temperature of 115° C. for 2 hours. After the completion of the reaction, 76 g of the reaction solution was collected after being cooled. Toluene was removed with an evaporator, and 43.5 g of the residue was washed with tap water to obtain 40.3 g (yield: 84.7%) of a reaction product (86.9 GC %), being a transparent, colorless liquid at room temperature, was obtained as the lower layer.

The reaction product was subjected to reduced pressure distillation under conditions of an inner pressure of 0.2 kPa, an inner temperature of 100 to 145° C., and a column top temperature of 63 to 65° C. to obtain 15.6 g (distillation yield: 44.4%) of a purified reaction product (99.6 GC %).

The resulting purified reaction product was confirmed by the results of $^1$H-NMR and $^{19}$F-NMR to be the compound represented by the following formula:

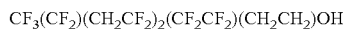

$^1$H-NMR (CDCl$_3$, TMS): δ 2.84 ($\underline{CH_2}CF_2CH_2CF_2$)
2.91 ($CH_2CF_2\underline{CH_2}CF_2$)
2.51 ($\underline{CH_2}CH_2$)
4.46 ($C\underline{H_2}CH_2$)
6.13 (C$\underline{H}$=CH$_2$)
6.41, 5.89 (CH=C$\underline{H_2}$)

$^{19}$F-NMR (CDCl$_3$, C$\underline{}_6$F$_6$): ppm −87.0 (C$\underline{F_3}$)
−116.7 (CF$_3$C$\underline{F_2}$)
−112.6 (CH$_2$C$\underline{F_2}$CH$_2$CF$_2$)
−112.9 (CH$_2$C$\underline{F_2}$CF$_2$CF$_2$)
−124.7 (CH$_2$CF$_2$C$\underline{F_2}$CF$_2$)
−114.4 (CH$_2$CF$_2$CF$_2$C$\underline{F_2}$)

Example 5

A copolymer solution having a solid content concentration of 19.8 wt % was prepared, as in Example 4, using the final reaction product (99.5 GC %)

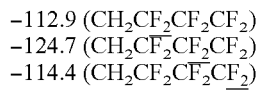

prepared in Reference Example 4, instead of the final reaction product prepared in Reference Example 2, in the same molar amount and using a solvent mixture of 1,1,1,2,2-pentafluoro-3,3-dichloropropane and 1,1,2,2,3-pentafluoro-1,3-dichloropropane (weight ratio of 45:55) as the polymerization solvent in the same amount. The weight-average molecular weight Mw of the resulting fluorine-containing copolymer was 35000. The copolymerization ratio measured by $^1$H-NMR confirmed that the content of BzMA in the copolymer was 45.2 mol %.

Example 6

A copolymer solution having a solid content concentration of 19.6 wt % was prepared, as in Example 4, using the final reaction product (99.2 GC %)

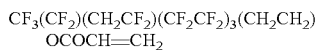

prepared in Reference Example 5, instead of the final reaction product prepared in Reference Example 2, in the same molar amount and using 1,3-bis-trifluoromethyl benzene as the polymerization solvent in the same amount. The weight-average molecular weight Mw of the resulting fluorine-containing copolymer was 34000. The copolymerization ratio measured by $^1$H-NMR confirmed that the content of BzMA in the copolymer was 43.2 mol %.

Example 7

A copolymer solution having a solid content concentration of 19.7 wt % was prepared, as in Example 4, using the final reaction product (99.0 GC %)

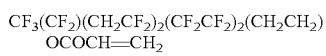

prepared in Reference Example 6, instead of the final reaction product prepared in Reference Example 2, in the same molar amount and using 1,4-bis-trifluoromethyl benzene as the polymerization solvent in the same amount. The weight-average molecular weight Mw of the resulting fluorine-containing copolymer was 35000. The copolymerization ratio measured by $^1$H-NMR confirmed that the content of BzMA in the copolymer was 43.6 mol %.

Example 8

A copolymer solution having a solid content concentration of 19.8 wt % was prepared, as in Example 4, using the final reaction product (99.1 GC %)

prepared in Reference Example 7, instead of the final reaction product prepared in Reference Example 2, in the same molar amount and using methyl perfluorobutyl ether C$_4$F$_9$OCH$_3$ as the polymerization solvent in the same amount. The weight-average molecular weight Mw of the resulting fluorine-containing copolymer was 37000. The copolymerization ratio measured by $^1$H-NMR confirmed that the content of BzMA in the copolymer was 40.8 mol %.

Example 9

A copolymer solution having a solid content concentration of 19.8 wt % was prepared, as in Example 4, using the final reaction product (99.6 GC %)

$$CF_3(CF_2)(CH_2CF_2)_2(CF_2CF_2)(CH_2CH_2)OCOCH=CH_2$$

prepared in Reference Example 8, instead of the final reaction product prepared in Reference Example 2, in the same molar amount and using $CF_3CHFCHFCF_2CF_3$ as the polymerization solvent in the same amount. The weight-average molecular weight Mw of the resulting fluorine-containing copolymer was 38000. The copolymerization ratio measured by $^1$H-NMR confirmed that the content of BzMA in the copolymer was 38.7 mol %.

Example 10

A copolymer solution having a solid content concentration of 19.6 wt % was prepared, as in Example 4, using the final reaction product (99.2 GC %)

$$CF_3(CF_2)_3(CH_2CF_2)(CF_2CF_2)(CH_2CH_2)OCOCH=CH_2$$

prepared in Reference Example 1, instead of the final reaction product prepared in Reference Example 2, in the same molar amount and using ethyl acetate as the polymerization solvent in the same amount. The weight-average molecular weight Mw of the resulting fluorine-containing copolymer was 38000. The copolymerization ratio measured by $^1$H-NMR confirmed that the content of BzMA in the copolymer was 40.3 mol %.

Example 11

A polymer solution having a solid content concentration of 19.6 wt % was prepared, as in Example 4, using stearyl methacrylate [StMA], instead of the benzyl methacrylate, in the same molar amount. The weight-average molecular weight Mw of the resulting fluorine-containing polymer was 34000. The copolymerization ratio measured by $^1$H-NMR confirmed that the content of StMA in the copolymer was 29.8 mol %.

Example 12

A copolymer solution having a solid content concentration of 19.7 wt % was prepared, as in Example 5, using stearyl methacrylate, instead of the benzyl methacrylate, in the same molar amount. The weight-average molecular weight Mw of the resulting fluorine-containing copolymer was 33000. The copolymerization ratio measured by $^1$H-NMR confirmed that the content of StMA in the copolymer was 30.0 mol %.

Example 13

A copolymer solution having a solid content concentration of 19.8 wt % was prepared, as in Example 6, using stearyl methacrylate, instead of the benzyl methacrylate, in the same molar amount. The weight-average molecular weight Mw of the resulting fluorine-containing copolymer was 34000. The copolymerization ratio measured by $^1$H-NMR confirmed that the content of StMA in the copolymer was 28.3 mol %.

Example 14

A copolymer solution having a solid content concentration of 19.6 wt % was prepared, as in Example 7, using stearyl methacrylate, instead of the benzyl methacrylate, in the same molar amount. The weight-average molecular weight Mw of the resulting fluorine-containing copolymer was 33000. The copolymerization ratio measured by $^1$H-NMR confirmed that the content of StMA in the copolymer was 28.5 mol %.

Example 15

A copolymer solution having a solid content concentration of 19.7 wt % was prepared., as in Example 8, using stearyl methacrylate, instead of the benzyl methacrylate, in the same molar amount. The weight-average molecular weight Mw of the resulting fluorine-containing copolymer was 35000. The copolymerization ratio measured by confirmed that the content of StMA in the copolymer was 25.8 mol %.

Example 16

A copolymer solution having a solid content concentration of 19.8 wt % was prepared, as in Example 9, using stearyl methacrylate, instead of the benzyl methacrylate, in the same molar amount. The weight-average molecular weight Mw of the resulting fluorine-containing copolymer was 35000. The copolymerization ratio measured by $^1$H-NMR confirmed that the content of StMA in the copolymer was 24.3 mol %.

Example 17

A copolymer solution having a solid content concentration of 19.6 wt % was prepared, as in Example 10, using stearyl methacrylate, instead of the benzyl methacrylate, in the same molar amount. The weight-average molecular weight Mw of the resulting fluorine-containing copolymer was 34000. The copolymerization ratio measured by $^1$H-NMR confirmed that the content of StMA in the copolymer was 25.6 mol %.

Example 18

A copolymer solution having a solid content concentration of 19.6 wt % was prepared, as in Example 4, using benzyl acrylate [BzA], instead of the benzyl methacrylate, in the same molar amount. The weight-average molecular weight Mw of the resulting fluorine-containing copolymer was 36000. The copolymerization ratio measured by $^1$H-NMR confirmed that the content of BzA in the copolymer was 47.0 mol %.

Example 19

A copolymer solution having a solid content concentration of 19.5 wt % was prepared, as in Example 4, using stearyl acrylate [StA], instead of the benzyl methacrylate, in the same molar amount. The weight-average molecular weight Mw of the resulting fluorine-containing copolymer was 37000. The copolymerization ratio measured by $^1$H-NMR confirmed that the content of StA in the copolymer was 29.9 mol %.

Comparative Example 4

A copolymer solution having a solid content concentration of 19.8 wt % was prepared, as in Example 4, using $CF_3$ $(CF_2)_5(CH_2)_2OCOCH\!=\!CH_2$, instead of the final reaction product prepared in Reference Example 2, in the same amount. The copolymerization ratio measured by $^1$H-NMR confirmed that the content of BzMA in the copolymer was 37.0 mol %.

Comparative Example 5

A copolymer solution having a solid content concentration of 19.7 wt % was prepared, as in Example 4, using $CF_3(CF_2)_7(CH_2)_2OCOCH\!=\!CH_2$, instead of the final reaction product prepared in Reference Example 2, in the same amount. The copolymerization ratio measured by $^1$H-NMR confirmed that the content of BzMA in the copolymer was 42.2 mol %.

The copolymer solutions prepared in Examples 4 to 19 and Comparative Examples 4 and 5 were diluted with the respective polymerization solvents used in the polymerization so as to have a solid content concentration of 2 wt %. The static contact angle as an index of water- and oil-repellent performance (oil barrier properties) was measured, as in Example 1, for water and decane. In addition, an oil diffusion test was conducted by the following method.

Oil diffusion test: Each diluted solution was applied on a grease (product of Kyodo Yushi, Multemp-SRL) enclosed bearing with a brush, followed by drying at room temperature. As the amount of oil exuded from the bearing, the weight of the bearing after the application was measured, and the amount of oil loss was determined to calculate the ratio thereof.

The results are shown in Table 2 below.

TABLE 2

| Example | Decane | Water | Oil diffusion test (%) |
|---|---|---|---|
| Example 4 | 71° | 121° | 0 |
| Example 5 | 72° | 122° | 0 |
| Example 6 | 71° | 122° | 0 |
| Example 7 | 72° | 122° | 0 |
| Example 8 | 67° | 117° | 0 |
| Example 9 | 66° | 118° | 0 |
| Example 10 | 66° | 117° | 0 |
| Example 11 | 72° | 122° | 0 |
| Example 12 | 72° | 121° | 0 |
| Example 13 | 71° | 122° | 0 |
| Example 14 | 71° | 121° | 0 |
| Example 15 | 66° | 118° | 0 |
| Example 16 | 67° | 117° | 0 |
| Example 17 | 66° | 117° | 0 |
| Example 18 | 72° | 122° | 0 |
| Example 19 | 72° | 121° | 0 |
| Comparative Example 4 | 51° | 111° | 3 |
| Comparative Example 5 | 72° | 121° | 0 |

Example 20

In a 500-mL glass reaction vessel, 73.0 g (0.125 mol) of the reaction product, $CF_3(CF_2)_3(CH_2CF_2)(CF_2CF_2)_2(CH_2CH_2)OCOCH\!=\!CH_2$, prepared in Reference Example 2, 6.0 g of 2-hydroxyethyl acrylate, 22.0 g of benzyl methacrylate, 4.0 g of polyalkyleneglycol monomethacrylate, 7.0 g of polyoxyethylene alkyl ether, 80.0 g of acetone, 0.5 g of n-dodecyl mercaptan, and 220.0 g of water were subjected to emulsion treatment at 60 MPa with a high pressure homogenizer. The resulting emulsion was replaced by nitrogen gas for 30 minutes, and then a aqueous solution composed of 11.0 g of vinylidene chloride, 6.0 g of N-methylol acrylamide, 2.5 g of 2,2'-azobis(2-amidinopropane).dihydrochloride, and 30.0 g of water was put in the emulsion for reaction at 70° C. for 4 hours. After completion of the reaction and cooling, 485 g of copolymer aqueous dispersion having a solid content concentration of 21.5% was obtained.

Comparative Example 6

A copolymer aqueous dispersion (452 g) having a solid content concentration of 21.0% was prepared, as in Example 20, using 65.0 g (0.125 mol) of $CF_3(CF_2)_7(CH_2CH_2)OCOCH\!=\!CH_2$ instead of $CF_3(CF_2)_3(CH_2CF_2)(CF_2CF_2)_2(CH_2CH_2)OCOCH\!=\!CH_2$.

Comparative Example 7

A copolymer aqueous dispersion (466 g) having a solid content concentration of 22.7% was prepared, as in Example 20, using 52.0 g (0.125 mol) of $CF_3(CF_2)_5(CH_2CH_2)OCOCH\!=\!CH_2$ instead of $CF_3(CF_2)_3(CH_2CF_2)(CF_2CF_2)_2(CH_2CH_2)OCOCH\!=\!CH_2$.

Comparative Example 8

A copolymer aqueous dispersion (480 g) having a solid content concentration of 24.4% was prepared, as in Example 20, using 40.0 g (0.125 mol) of $CF_3(CF_2)_3(CH_2CH_2)OCOCH\!=\!CH_2$ instead of $CF_3(CF_2)_3(CH_2CF_2)(CF_2CF_2)_2(CH_2CH_2)OCOCH\!=\!CH_2$.

Each of the copolymer aqueous dispersions prepared in Example 20 and Comparative Examples 6 to 8 was diluted with water so as to have a solid content concentration of 0.5 wt %. Each piece of cotton fabric, cotton/polyester blend fabric, polyester fabric, and nylon fabric was immersed in the diluted dispersions to measure water repellent performance (compliance with JIS L1092) and oil repellent performance (compliance with AATCC-TM118). The wet pick-up after squeezing was 110% in the cotton fabric, 75% in the cotton/polyester blend fabric, 115% in the polyester fabric, and 45% in the nylon fabric. The drying was conducted at 80° C. for 10 minutes, and curing was conducted at 150° C. for 3 minutes for the cotton fabric, the cotton/polyester blend fabric, and the polyester fabric, and at 170° C. for 1.5 minutes for the nylon fabric.

The results are shown in Table 3 below. The numerical values in the table show oil-repellent evaluation/water-repellent evaluation.

TABLE 3

| Water-oil-repellent performance | Example 20 | Comparative Example 6 | Comparative Example 7 | Comparative Example 8 |
|---|---|---|---|---|
| Cotton | 6/100 | 6/100 | 5/70 | 4/70 |
| Cotton/polyester | 7/100 | 7/100 | 5/80 | 4/50 |
| Polyester | 6/100 | 6/100 | 5/70 | 4/70 |
| Nylon | 7/100 | 7/100 | 7/80 | 5/70 |

The invention claimed is:

1. A fluorine-containing polymer comprising a fluoroalkyl alcohol acrylic acid derivative or a corresponding methacrylic acid derivative represented by a general formula:

$C_nF_{2n+1}(CH_2CF_2)_a(CF_2CF_2)_b(CH_2CH_2)_cOCOCR\!=\!CH_2$ wherein in the formula, R is a hydrogen atom or a methyl group, n is an integer of 1 to 6, a is an integer of 1 to 4, b is an integer of 1 to 3, and c is an integer of 1 to 3, containing in 5 to 100 wt % as a polymerization unit and having a weight-average molecular weight Mw of 2000 to 20000000.

2. The fluorine-containing polymer according to claim 1, wherein the fluoroalkyl alcohol acrylic acid derivative or the corresponding methacrylic acid derivative is copolymerized with a polyfluoroalkyl group-containing acrylate monomer or a corresponding methacrylate monomer represented by a general formula:

$$CH_2=CRCOOR_1\text{-}(NR_2SO_2)_m\text{-}Rf$$

wherein in the formula, R is a hydrogen atom or a methyl group, $R_1$ is a divalent organic group, $R_2$ is a lower alkyl group having 1 to 5 carbon atoms, Rf is a polyfluoroalkyl group having 1 to 6 carbon atoms, and m is 0 or 1, and/or a non-fluorine atom-containing polymerizable monomer.

3. The fluorine-containing polymer according to claim 2, wherein in the polyfluoroalkyl group-containing acrylate monomer or the corresponding methacrylate monomer that is copolymerized with the fluoroalkyl alcohol acrylic acid derivative or the corresponding methacrylic acid derivative, when the $R_1$ group is a polyfluoroalkylene group and m=0, the number of carbon atoms as the total with that of the terminal perfluoroalkyl group is 1 to 6.

4. The fluorine-containing polymer according to claim 2 wherein the non-fluorine atom-containing polymerizable monomer that is copolymerized with the fluoroalkyl alcohol acrylic acid derivative or the corresponding methacrylic acid derivative is an acrylic acid ester or a methacrylic acid ester represented by a general formula:

$$R_3OCOCR=CH_2$$

wherein in the formula, R is a hydrogen atom or a methyl group; $R_3$ is an alkyl group, an alkoxyalkyl group, a cycloalkyl group, an aryl group, or an aralkyl group, a monoalkyl or dialkyl ester of fumaric acid or maleic acid, or a vinyl ester.

5. A surface-modifying agent comprising a fluorine-containing polymer according to claim 1 as an active ingredient.

6. The surface-modifying agent according to claim 5, wherein the agent is prepared as an organic solvent solution.

7. The surface-modifying agent according to claim 6, wherein the organic solvent is a fluorine-containing organic solvent.

8. The surface-modifying agent according to claim 7, wherein the agent is a water- and oil-repellent.

9. The surface-modifying agent according to claim 7, wherein the agent is an oil barrier.

10. The surface-modifying agent according to claim 6, wherein the agent is a water- and oil-repellent.

11. The surface-modifying agent according to claim 6, wherein the agent is an oil barrier.

12. The surface-modifying agent according to claim 6, wherein the organic solvent is an ester-based solvent.

13. The surface-modifying agent according to claim 12, wherein the ester-based solvent is ethyl acetate.

14. The surface-modifying agent according to claim 13, wherein the agent is a water- and oil-repellent.

15. The surface-modifying agent according to claim 13, wherein the agent is an oil barrier.

16. The surface-modifying agent according to claim 12, wherein the agent is a water- and oil-repellent.

17. The surface-modifying agent according to claim 12, wherein the agent is an oil barrier.

18. The surface-modifying agent according to claim 5, wherein the agent is prepared as an aqueous dispersion.

19. The surface-modifying agent according to claim 18, wherein the agent is a water- and oil-repellent.

20. The surface-modifying agent according to claim 18, wherein the agent is an oil barrier.

21. The surface-modifying agent according to claim 5, wherein the agent is a water- and oil-repellent.

22. The surface-modifying agent according to claim 5, wherein the agent is an oil barrier.

* * * * *